Dec. 14, 1965 E. N. REYNOLDS Re. 25,942
SPRINKLER HEAD
Original Filed Oct. 21, 1957
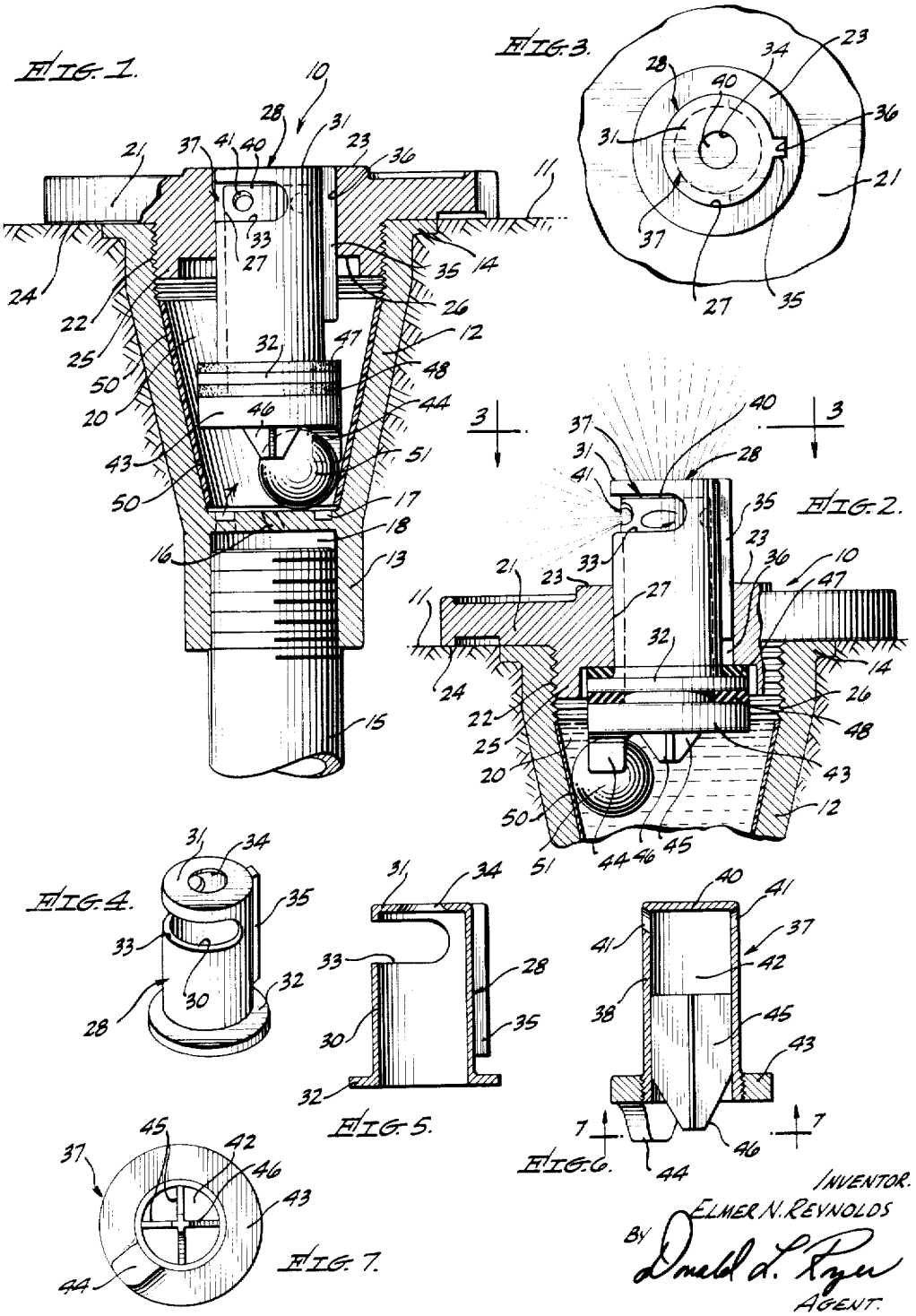

United States Patent Office

Re. 25,942
Reissued Dec. 14, 1965

25,942
SPRINKLER HEAD

Elmer N. Reynolds, 16104 Lashburn St., Whittier, Calif.

Original No. 2,990,120, dated June 27, 1961, Ser. No. 18,195, Mar. 28, 1960, which is a substitute for abandoned application Ser. No. 691,431, Oct. 21, 1957. Application for reissue June 20, 1963, Ser. No. 290,282
11 Claims. (Cl. 239—206)

Matter enclosed in heavy brackets [ ] appears in the original patent but forms no part of this reissue specification; matter printed in italics indicates the additions made by reissue.

This invention relates to sprinkler heads and relates more particularly to a pop-up intermittently rotatable fluid pressure operable sprinkler head.

This application is a substitute for application Serial Number 691,431, now abandoned.

Heretofore, in pop-up sprinklers, that is, sprinklers having water discharge heads that are disposed upwardly by water pressure during use and recede into a head body when not in use, many problems relating to material wear, water leakage, high frictional characteristic, clogging by foreign material, corrosion and water flow characteristics have been encountered. In a rotary type sprinkler head, it has heretofore been necessary to provide complex mechanism, levers, paddle members, ratchets and the like in order to effect rotation thereof by action of water force and pressure. In mechanisms of this prior type, it may therefore be seen that excessive wear is to be experienced in view of the large number of moving parts, many joints, junctions, springs and the like. Additionally, corrosion problems not only tend to bind operating points but also further tend to clog water outlets. Inasmuch as prior devices required high operating forces, ultimate water flow has been reduced due to work extraction from the water force, thus requiring excessively large supply pipes and thus adding to the cost thereof. As prior rotary type sprinklers were used, the effectiveness was reduced due to increasing frictional losses and wear of components thereof.

It is, therefore, one object of the present invention to provide a novel pop-up rotary sprinkler head.

Another object of the invention is to provide a pop-up rotary sprinkler head having reliable operating characteristics, being non-clogging, simple in construction and having low frictional forces.

A further object of the invention is to provide a pop-up rotary sprinkler head having means directly operable by water pressure for rotating the head in a step fashion.

Still another object of the invention is to provide a pop-up rotary sprinkler head having efficient water flow characteristics enabling utilization of relatively smaller delivery piping.

Other and further important objects of the invention will become apparent from the disclosures in the following detailed specification, appended claims and accompanying drawings wherein:

FIGURE 1 is a transverse view partially in section showing the sprinkler head whereof in a static condition with the rotating portion thereof in a depressed position;

FIG. 2 is a fragmentary sectional view similar to FIG. 1 and showing the sprinkler head in an extended operating position;

FIG. 3 is a fragmentary top plan view of the sprinkler head;

FIG. 4 is a detailed perspective view of the sleeve element of the sprinkler head;

FIG. 5 is a detailed sectional view of the sleeve element of the present sprinkler head;

FIG. 6 is a detailed sectional view of the rotatable core assembly of the present sprinkler head; and FIG. 7 is a bottom plan view of the core assembly.

With reference to the drawing, the sprinkler head hereof is shown as indicated generally at 10. The present head is adapted for disposition in the ground, a level therefore being indicated at 11. It is to be noted that the major portion of the head is located within the ground and that the portion disposed above the surface 11 is at a minimum and generally of a height less than the height of surrounding growth in order not to interfere with the operation of mowing machines or the like. As shown, the sprinkler head includes a body 12 that is generally conical and has a cylindrical extension portion 13 and a flange portion 14. The cylindrical portion 13 is adapted for threadable reception of a supply conduit 15. The body 12 has integral transverse wall 16 through which generally angularly disposed notches 17 are formed. Outer ends of the nozzles 17 communicate with an end delivery area from the conduit 15, inner ends of these nozzles communicating with a chamber 20 defined within the body 12. The construction of the nozzle 17 is such as to deliver water to the chamber 20 in a swirling manner for a purpose to be hereinafter more fully described. A cap member 21 is threadably secured to the body 12 as at 22 and extends radially outwardly therefrom. The cap member 21 has an upper surface and a lower surface 24, together with an extension portion 25. The surface 24 is adapted to be positioned in substantial alignment with the surface 11 of the surrounding terrain. The extension portion 25 has an annular recess 26 in the lower end thereof, there being an axially disposed bore 27 communicating between the upper surface 23 of the cap member and the recess 26.

As shown in FIGS. 1 and 2, a sleeve member 28 is positioned within the bore 27 and adapted for axial slidable movement therein. The sleeve member 28 is shown in detail in FIGS. 4 and 5 and includes a tubular portion 30 having an end wall 31 on one end thereof and a radially upwardly extending flange 32 on the other end thereof. A transverse slot 33 is provided in the tubular portion 30 adjacent the end wall 31 and the end wall 31 is provided with a central conical opening 34. Additionally, the tubular portion 30 has a rib 35 formed longitudinally along a surface thereof, the rib 35 being adapted for cooperation with an elongated slot 36 in the surface of the bore 27 and in the cap member 21. Thus, it may be seen that the sleeve member 28 is axially slidable within the bore 27 and is held against rotation by means of the rib 35 and the disposition thereof in the groove 36.

A core assembly 37 is positioned for rotatable movement within the sleeve member 28 and is shown in detail in FIGS. 6 and 7. The core assembly 37 has a tubular portion 38 with a closed end wall 40, there being a pair of annularly upwardly directed bores 44 through the wall of the tubular portions 38 and adjacent the end wall 40. The bores 41 communicate with the interior 42 of the core assembly. The end of the tubular portion 38 remote from the end wall 40 has a collar 43 threadably secured thereto, thus forming a flange on the tubular portion 38, there being a downwardly extending projection 44 disposed from the collar 43. Additionally, a segmented deflector 45 is press fit within the tubular portions 38 and has a conical end portion 46 that extends beyond the opened end of the tubular portion 38.

As shown in FIGS. 1 and 2, the core assembly 37 is adapted for disposition within the sleeve member 28 with the bores 41 being in alignment with the slot 33. A gasket 47 is positioned about the sleeve member 28 and disposed in contact with the flange 32, this gasket serving to provide a seal between the flange 32 and the base of the recess 26. A second gasket 48 is disposed on the collar 43 and provides a seal between this collar and the lower surface of the flange 32. The gaskets 47 and 48 are freely disposed in their respective positions, the gasket 47 serving to prevent water flow about the sleeve member 28 and the gasket 48 serving a dual purpose of providing both a water seal and slight frictional characteristics and a low resistance to rotation as between the core assembly 37 and the sleeve member 28.

As further shown in FIGS. 1 and 2, a liner 50 that may be of plastic material or the like is disposed within the chamber 20 and in contact with the inner wall of the body 12. A ball 51 is also freely disposed within the chamber 20.

In operation, the water delivered to the chamber 20 from the nozzle 17 serves to create hydraulic pressure within this chamber, thus first to move both the sleeve 28 and core assembly 27 from the position shown in FIG. 1 to the position shown in FIG. 2 whereby to dispose the outer ends of the bores 41 at a position substantially above the surface of the surrounding terrain. Water entering the chamber 20 will thereafter be conducted to the interior 42 of the core assembly 37 and upwardly therefrom through one or the other of the bores 41. Additionally, a small quantity of the water will be delivered past the wall 40 of the core assembly 37 and outwardly through the conical opening 34 of the sleeve member 28. The slot 33 in the sleeve member 28 serves to restrict water flow to one or the other of the bores 41 and further serves to describe the particular water sprinkling pattern of the present sprinkler head. In this connection, it is to be understood that the circumferential length of the slot 33 may vary depending upon the particular sprinkling requirements desired. The slot illustrated is of a length permitting 180° sprinkling.

As the water is delivered from the nozzles 17 to the chamber 20, the ball 51 will be carried by the water and moved in an upward and rotary manner whereby to strike the projection 44 carried by the collar 43. The momentum of the ball 51 is thereafter lost and the ball is permitted to move gravitationally downward, whereupon to be conducted by the water in another circular path, again to strike the projection 44. The repeated action of the ball 51 in striking the projection 44 serves to rotate the core assembly and provide the desired sprinkling pattern. When the water pressure within the chamber 20 is shut off, the various components of the present sprinkler will return to the positions shown in FIG. 1.

It is preferable that the various components of the present sprinkler may be made from a non-corrosive material such as brass or the like; however, the collar 43 and the integral projection 44 are preferably made from a hardened non-corrosive material such as stainless steel or the like. The ball 51 may also be made from brass or the like with any tendency for wear between the ball 51 and the conical wall portions of the body 12 being effectively reduced by means of the plastic liner 50. The deflector 45 may be made from any sheet type material with the projecting portion 46 therefor serving to deflect the ball 51 and prevent any occlusion of the end of the tubular member 38 about the ball during operation of the sprinkler. It is also to be understood that the ball 51 may be of any desired shape; however, during use thereof, the normal characteristics of operation will reduce the ball to a spherical shape. By utilizing a ball 51 of a softer material than the projection 44, long ball life is experienced, thus enabling a longer length of life of the sprinkler head.

While the sprinkler head illustrated herein is indicated primarily for the sprinkling of an 180° arc, it is to be understood that different arcuate patterns may be sprinkled by providing different angular spacing between circumferential ends of the slot 33. Additionally, for full circle sprinkling, the sleeve member 28 may be eliminated with slight reconstruction of the core assembly 37 to permit both axial and rotary movement in the bore 27 in the cap member 21.

It may thus be seen that the present sprinkler member provides the desired pop-up and rotary characteristics with a minimum of components whereby to reduce the operating force required below that normally required for heretofore known sprinklers having similar sprinkler characteristics. Additionally, due to the efficient operation of the present sprinkler head, a reduced delivery pipe size may be used, thus considerably reducing the cost of such pipe.

Having thus described the invention and the present embodiment thereof, it is desired to emphasize the fact that many modifications may be resorted to in a manner limited only by a just interpretation of the following claims.

I claim:

1. In a sprinkler head, the combination of: a housing body having a cap operatively associated with an upper end thereof, water from a supply conduit being adapted for delivery to an interior of said body; means carried by a lower end of said body for creating a swirling motion to said water entering said body interior; a sleeve disposed for axial movement in a bore in said cap; a water dispensing core rotatably positioned in said sleeve and having water ejection port means therein, said sleeve having a transverse slot, said port means cooperable with said slot whereby to produce an angularly limited water dispensing pattern from said port means; a projection depended from a lower end of said core; and a ball disposed in said interior of said body, water pressure in said interior of said body being adapted to act upon said sleeve and said core and cause upward movement thereof, said swirling motion of said water serving to move said ball into intermittent engagement with said projection whereby to rotate said core within said sleeve.

2. A sprinkler head according to claim 1 wherein means are provided between said sleeve and said body to prevent rotation of said sleeve and rotation resistant means are disposed between said sleeve and said core.

3. A sprinkler head according to claim 1 wherein said core includes a tubular portion and means are disposed in a lower end of said tubular portion to prevent occlusion of said end thereof by said ball.

4. A pop-up rotary sprinkler head comprising, in combination: a body adapted for disposition below ground level; a cap connected with an upper end of said body, said body having a hollow interior, said cap having a central bore communicating with said interior, a lower end of said body being adapted for securing to a water supply conduit whereby to deliver water under pressure to said interior of said body; water swirling nozzles carried by said body and disposed between a discharge end of said supply conduit and said interior of said body; a sleeve slidably positioned in said bore; means carried by said sleeve and cooperable with said body for preventing rotation of said sleeve relative to said cap; a core assembly freely rotatably positioned in said sleeve; means for limiting upward movement of said sleeve and said core assembly relative to said cap; water passage means within said core assembly, said passage means having a lower end disposed in communication with said interior of said body and laterally directed port means adjacent an upper end thereof; a transverse slot in said sleeve and overlying said port means; a downwardly extending projection from a peripheral portion of said core assembly; and a ball freely disposed in said interior of said body, water pressure in said interior of said body being adapted to act upon said core assembly [to cause upward limited movement of said core assembly] and said sleeve, water delivered into said interior of said body from said swirling nozzles serving to move said ball into intermittent engagement with said projection whereby to rotate said core in a step manner within said sleeve, said upward movement limiting means for said sleeve and said core assembly comprising radially outwardly extending flanges carried by lower ends of said sleeve and said core assembly, sealing and rotation resisting gaskets being disposed in contact with said flanges.

*5. In a sprinkler head:*

*(A) a housing having a hollow interior defined by a frusto-conical surface which flares outwardly toward one end;*

*(B) fluid discharge nozzle means rotatably mounted at the larger end of said housing, said nozzle means having a projection at the inner end;*

*(C) and a movable element disposed within the flaring hollow interior of said housing, freely movable upwardly and circularly by fluid introduced into said housing for intermittent engagement with said projection to effect intermittent rotational movement of said nozzle means.*

*6. In a sprinkler head:*

*(A) a housing having a hollow interior portion defined by a frusto-conical surface which flares outwardly toward one end;*

*(B) a nozzle operably mounted at the larger end of said housing for longitudinal and rotatable movement, said nozzle having fluid inlet, and fluid discharge means open when said nozzle is moved longitudinally to an extended position, said nozzle having a projection at one end;*

*(C) and a movable element within the flaring interior portion of said housing, freely movable upwardly and circularly by fluid introduced into said housing for intermittent engagement with said projection to effect intermittent rotational movement of said nozzle.*

*7. In a sprinkler head:*

*(A) a hollow body having an interior defined by an upwardly flaring frusto-conical surface;*

*(B) nozzle means slidable and rotatably mounted in the upper end of said body and moved from a position partly within the flaring interior of said body to an upper operative position by fluid pressure in said housing, said nozzle means having discharge orifice means;*

*(C) means limiting outward sliding movement of said nozzle means;*

*(D) a projection on the lower end of said nozzle means and at one side thereof;*

*(E) a free moving ball operably disposed in the flaring interior of said hollow body;*

*(F) and means for introducing fluid into the lower end of said body and effecting swirling of said fluid within said body for action on said ball to cause said ball to circulate upwardly for intermittent engagement with said projection.*

*8. In a sprinkler head:*

*(A) a housing having a hollow interior defined by a frusto-conical surface flaring toward one end, said housing having obliquely arranged fluid inlet means at the smaller end;*

*(B) a nozzle operably mounted at the larger end of said housing for longitudinal movement under the influence of fluid pressure in said housing and for rotatable movement, said nozzle having a fluid inlet and fluid discharge means open when said nozzle is longitudinally moved to an extended position, said nozzle having a projection at the inner end;*

*(C) and a spherical element within the flaring interior of said body freely movable upwardly and circularly by fluid introduced through said inlet.*

*9. In a sprinkler head:*

*(A) a hollow body, an interior portion of which is defined by a frusto-conical surface which flares upwardly, said body having an inlet at the lower, smaller end;*

*(B) a wear reducing plastic liner in said body of substantially the shape of the interior of said body;*

*(C) a nozzle operably mounted at the upper end of said body for rotational movement, said nozzle having an inlet and a discharge orifice;*

*(D) a projection at the lower end of said nozzle and offset from the axis thereof;*

*(E) a ball operably disposed within the flaring interior portion of said body;*

*(F) and means for swirling fluid introduced into said body for causing said ball to circulate upwardly for intermittent engagement with said projection.*

*10. In a sprinkler head:*

*(A) a hollow body, the interior of which is defined by a frusto-conical surface which flares upwardly, the interior of said body being adapted to receive a free moving element therein, said body having an inlet at the lower end;*

*(B) a resilient plastic liner in said body conforming substantially to the shape of the interior thereof;*

*(C) nozzle means operably mounted at the upper end of said body for rotational movement, said nozzle having an inlet and a discharge orifice;*

*(D) a projection at the lower end of said nozzle means offset from the axis thereof;*

*(E) and means for swirling fluid within said body.*

*11. In a sprinkler head:*

*(A) a hollow body, the interior of which is defined by a frusto-conical surface which flares upwardly and is adapted to receive a free moving element therein, said body having an inlet at the smaller lower end;*

*(B) a wear reducing liner in said body conforming substantially to the shape of the interior thereof;*

*(C) nozzle means operably mounted at the upper end of said body for rotational movement, said nozzle having an inlet and a discharge orifice;*

*(D) a projection at the lower end of said nozzle means offset from the axis thereof;*

*(E) and means for swirling fluid within said body.*

References Cited by the Examiner

The following references, cited by the Examiner, are of record in the patented file of this patent or the original patent.

UNITED STATES PATENTS

| | | | |
|---|---|---|---|
| 1,568,250 | 1/1926 | Stanton | 239—241 |
| 1,593,918 | 7/1926 | Stanton | 239—236 |
| 1,742,898 | 1/1930 | Buelna | 239—237 |
| 1,756,729 | 4/1930 | Coles et al. | 239—206 |
| 1,919,243 | 7/1933 | Munz | 239—206 |
| 1,970,126 | 8/1934 | Buckner | 239—206 |
| 2,009,478 | 7/1935 | Coles et al. | 239—241 |
| 2,052,673 | 9/1936 | Stanton | 239—241 |
| 2,268,855 | 1/1942 | Brooks | 239—206 |
| 2,589,942 | 3/1952 | Hruby | 239—591 X |
| 3,127,110 | 3/1964 | Reynolds | 239—204 |

M. HENSON WOOD, Jr., *Primary Examiner.*

EVERETT W. KIRBY, *Examiner.*

D. L. MOSELEY, *Assistant Examiner.*